3,439,044
PROCESS FOR THE PREPARATION OF ACETALDEHYDE
Lothar Hirsch, Kelkheim, Taunus and Lothar Hörnig, Günther Mau and Therese Quadflieg, Frankfurt am Main, Germany, assignors to Farbwerke Hoechst Aktiengesellschaft vormals Meister Lucius & Bruning, Frankfurt am Main, Germany, a corporation of Germany
No Drawing. Filed Mar. 16, 1965, Ser. No. 440,289
Claims priority, application Germany, Mar. 26, 1964,
F 42,438
Int. Cl. C07c 45/04
U.S. Cl. 260—604   6 Claims

ABSTRACT OF THE DISCLOSURE

A process has been provided for the preparation of acetaldehyde by oxidizing ethylene with oxygen in the presence of water and a catalyst which comprises using as a catalyst an elementary precious metal of Group VIII of the Periodic System of the elements according to Mendeleeff. A preferred catalyst is palladium metal per se on an inert carrier substance.

---

The present invention relates to a process for the preparation of acetaldehyde.

It is known that acetaldehyde can be prepared by oxidizing ethylene with oxygen in the presence of water when using as catalysts dissolved palladium compounds and salts of metals that may occur in different valence states. The chlorides of palladium and copper are preferably used as catalysts. However, with the use of these catalysts halogen-containing byproducts are formed.

Now we have found that acetaldehyde can be prepared by oxidizing ethylene with oxygen in the presence of water and catalysts in an advantageous manner with the use of a solid catalyst containing an elementary precious metal of Group VIII of the Periodic Table.

Suitable precious metals are platinum, rhodium, iridium, ruthenium and, especially, palladium.

The precious metal is advantageously deposited on an inert carrier substance such as aluminum oxide or aluminum silicate or silica gel.

The catalyst is prepared in a very simple manner. For example, a solution of a palladium salt, for example the chloride, is deposited on a carrier. After drying, the palladium is reduced to the metal in a current of hydrogen at about 100° C. After the reduction has been completed, an extract of the catalyst in hydrochloric acid remains colorless, i.e., the catalyst is free from palladium-II-chloride. The catalyst is rinsed with hot water until the rinsing water which is running off is free from chloride ions. When a coarse-grained carrier substance is used, the interior of the grains of the finished catalyst also should be dyed a deep black shade. The precious metal salt can, of course, also be reduced in a different manner, for example by the action of hydrazine salts or reducing gases such as hydrogen.

It is advantageous to adjust the precious metal content of the catalyst at an amount that is not too low, preferably ranging from 5 to 30% by weight, especially 5 to 20% by weight, calculated on the sum of the weights of carrier and precious metal. Higher concentrations are of little avail because in the process of reduction the metal would tend to deposit in thick layers which, probably owing to the reduced surface, impair the efficiency of the catalyst.

The advantage of the process according to the invention is that no chlorine-containing by-products are obtained as they are formed in the aforementioned processes by copper-II-chloride. Moreover, the use of the process on an industrial scale does not require expensive construction materials such as, for example, titanium, because the solid catalyst does not have corrosive properties. The oxidation can take place both in the liquid phase and in the gaseous phase.

In the preparation of acetaldehyde, gaseous mixtures containing ethylene and oxygen are passed over the catalyst which shall simultaneously be in contact with water or steam. It should be noted that the dry catalyst may become glowing red when ethylene/oxygen mixtures are passed over it and that the gaseous mixtures—depending on their composition—may be explosive.

The catalyst is advantageously filled into a tower and water is caused to trickle over it, while the gaseous mixture is passed in from above or from below. The aldehyde formed in partly contained in the escaping current of gas from which it is removed by scrubbing with water or by cooling, but partly also in the discharged water. Instead of the trickling tower there may also be used a reactor filled with liquid. In this case, the crude gas is, of course, passed in at the lower end of the reactor. The operation is carried out at temperatures within the range of from 0° C. to the respective boiling temperature of the water, preferably at a temperature above 30° C.

Furthermore, it is possible to pass a gaseous mixture containing ethylene, oxygen and steam over the catalyst, i.e., the operation is carried out in the gaseous phase. In this case, the temperature should not be too high because otherwise the conversion of starting materials decreases. Temperatures not exceeding about 150° C. are used, in particular temperatures within the range of from 10° to 100° C. above the respective boiling temperature of water.

It has proved to be advantageous to maintain the liquid phase in the weakly alkaline range, i.e., at a pH of 7–9. For this purpose salts are used which have a feeble basic reaction, for example a 5% aqueous solution of trisodium phosphate by weight. However, there may also be used an alkali metal carbonate or an alkali metal acetate. When working in the gaseous phase there may, correspondingly, be used a catalyst containing trisodium phosphate.

The acetaldehyde is obtained in a yield of 90% and above in the temperature range of from 50° to 150° C. As byproducts there were found carbon dioxide and acetic acid as well as small amounts of carbon monoxide.

The process can be carried out at normal pressure, as well as at an elevated or at a reduced pressure.

In most cases the conversion is not complete. For this reason, the substances used which have not reacted, i.e., ethylene and oxygen, and the recovered water are suitably reused by recirculating them. It is, however, necessary to eliminate part of these products as off gas because otherwise the concentration of carbon dioxide in the circulating gas would be too high.

The following examples serve to illustrate the invention but they are not intended to limit it thereto:

Example 1

500 cc. aluminum silicate (bentonite) in the form of spheres having a diameter of 5 mm. were impregnated with 50 grams of palladium-II-chloride (=30 grams Pd), reduced with hydrogen and washed until free from chloride ions. The catalyst was filled into a vertical, heatable pipe having a diameter of 25 mm. and a height of 1000 mm., 100 ml. water, 1 mol ethylene and 0.5 mol oxygen were introduced per hour at the upper end of the reactor adjusted at an internal temperature at 85° C. The product discharged at the bottom of the reactor was cooled first to 20° C. and then to −70° C. The condensation products obtained at 20° C. or −70° C., respectively, which were discharged every hour, contained 0.05 or 0.07 mol, respectively, of acetaldehyde. Moreover, in the condensation product obtained at 20° C. there were found 0.005 mol acetic acid and in the off gas 0.01 mol/h. of carbon dioxide as well as traces of carbon monoxide. The yield, accordingly, amounted to 0.12 mol of 0.13 mol ($CO_2$ being calculated at 50% only), i.e., 92%, while the conversion amounted to 0.13 mol of 1.0 mol, i.e., 13%.

Example 2

The oxidation was carried out under the same conditions as those described in Example 1, however, instead of water there was used an aqueous 5% $Na_3PO_4$ solution by weight. The condensation products contained together 0.19 mol/h. acetaldehyde and 0.01 mol/h. acetic acid.

Example 3

Under the same conditions as those described in Example 2 there was used $NaH_2PO_4$ instead of $Na_3PO_4$. The amount of acetaldehyde formed altogether amounted to 0.09 mol/h.

Example 4

(a) In another test which was carried out under the same conditions as those described in Example 1, the operation was carried out at a temperature of 60° C. 0.06 mol acetaldehyde were obtained per hour.

(b) At an internal temperature of 120° C. there were obtained, per hour, 0.14 mol acetaldehyde, 0.01 mol acetic acid and 0.02 mol carbon dioxide.

(c) At an internal temperature of 180° C., the yield of acetaldehyde was 0.01 mol/h., while the amount of carbon dioxide formed per hour was 0.2 mol.

Example 5

(a) A steel reactor having the dimensions of the glass reactor of Examples 1 to 4 and being filled with the same catalyst, was charged, per hour, with the same amounts of ethylene, oxygen and water at a temperature of 120° C. and under a pressure of 5 atomspheres gage. At the bottom of the reactor the pressure was released and the mixture discharged was cooled in stages. There were obtained, per hour, 0.22 mol acetaldehyde, 0.02 mol acetic acid and 0.02 mol carbon dioxide. As compared with Example 4b, an increase of pressure thus brought about an increase of the rate of conversion of 50%.

(b) When the operation was carried out under a pressure of 10 atmospheres gage, the rate of conversion per hour increased to 0.24 mol acetaldehyde.

Example 6

With the use of two more catalysts which contained as carrier substances aluminum oxide or silica gel, there were obtained under the same conditions as those described in Example 1 0.12 or 0.09 mol/h., respectively, of acetaldehyde.

Example 7

1 liter of aluminum oxide in the form of spheres having a diameter of 7 mm. was evaporated to dryness together with a solution of 30 grams palladium-II-chloride (=18 grams Pd) in aqueous hydrochloric acid in the rotary evaporator. The dry material was treated with hydrogen at 150° C. whereby the palladium chloride was reduced to the metal. The catalyst was washed with water until it was free from chloride ions.

The catalyst which was still moist was filled into a jacketed pipe having a length of 2 m. and an internal diameter of 25 mm. While heating the reaction pipe at 100° C., there were added at the head of the reactor, per hour, 150 ml. liquid water and 52 normal liters of a gas mixture containing 82% by volume of ethylene, 17% by volume of oxygen and 1% by volume of nitrogen. At the bottom of the reactor the mixture discharged was cooled whereby a condensation product of high moisture content was obtained. The off gas was passed on to a washing column which was charged per hour with 200 ml. water. The washing water and the condensation product contained together 6.6 grams acetaldehyde, 1.8 grams ethylene glycol and 0.7 gram acetic acid.

We claim:
1. A process for the preparation of acetaldehyde by oxidizing ethylene with oxygen in the presence of water and a catalyst consisting essentially of elementary palladium.

2. A process as claimed in claim 1, in which the metal is applied in a finely divided form on an inert carrier substance.

3. A process as claimed in claim 1, in which the process is carried out at a temperature within the range of from 20° to 300° C.

4. A process as claimed in claim 1, in which the process is carried out at a temperature within the range of from 50° to 200° C.

5. A process as claimed in claim 1, in which the process is carried out at a temperature within the range of from 50° to 150° C.

6. A process for the preparation of acetaldehyde by oxidizing ethylene with oxygen in the presence of water and a catalyst consisting essentially of elementary palladium wherein salts selected from the group consisting of trisodium phosphate, alkali metal carbonates and alkali metal acetates are added to said water.

References Cited

UNITED STATES PATENTS

| | | | |
|---|---|---|---|
| 3,300,528 | 1/1967 | Wakasa et al. | 260—604 X |
| 3,277,158 | 10/1966 | Schaeffer | 260—604 X |
| 3,131,223 | 4/1964 | Schmidt et al. | 260—604 X |

LEON ZITVER, *Primary Examiner.*

R. H. LILES, *Assistant Examiner.*

U.S. Cl. X.R.
252—472